United States Patent [19]

Borelan et al.

[11] 4,034,938
[45] July 12, 1977

[54] AUTOMATIC PERFORMANCE RESERVE (APR) SYSTEM HAVING MEANS INDICATIVE OF SYSTEM ARMED CONDITION

[75] Inventors: Alexander P. Borelan, Bellevue; James T. Giffin, Renton; Peter J. Louden, Mercer Island; Malcolm L. Olthouse, Bellevue, all of Wash.

[73] Assignee: The Boeing Company, Seattle, Wash.

[21] Appl. No.: 671,924

[22] Filed: Mar. 30, 1976

Related U.S. Application Data

[63] Continuation-in-part of Ser. No. 570,928, April 22, 1975, Pat. No. 3,987,279.

[51] Int. Cl.² .................. B64D 25/00; G06F 15/50
[52] U.S. Cl. .................. 244/53 R; 60/39.15; 73/117.4; 235/150.21; 244/188
[58] Field of Search ............... 235/150.21, 153 AE, 235/153 AK, 150.2, 150.22; 60/39.15; 244/53 R, 188; 73/178 T, 117.4; 340/213 R

[56] References Cited

U.S. PATENT DOCUMENTS

| 3,514,055 | 5/1970 | Gregoire et al. | 60/39.15 |
| 3,715,093 | 2/1973 | Van Dyke | 60/39.15 |
| 3,987,279 | 10/1976 | Borelan et al. | 235/150.21 |

Primary Examiner—Malcolm A. Morrison
Assistant Examiner—Errol A. Krass
Attorney, Agent, or Firm—Conrad O. Gardner; Glenn Orlob

[57] ABSTRACT

A logic controlled APR system including arming logic, engine failure detection circuits, and test circuit means for testing system operating condition without engine operation. The logic controlled APR system detects an engine failure in a multi-engine aircraft and provides solenoid controlled increased fuel flow to the remaining normally operating engines, and includes a disarm mode in the event of an RTO (rejected take-off).

3 Claims, 1 Drawing Figure

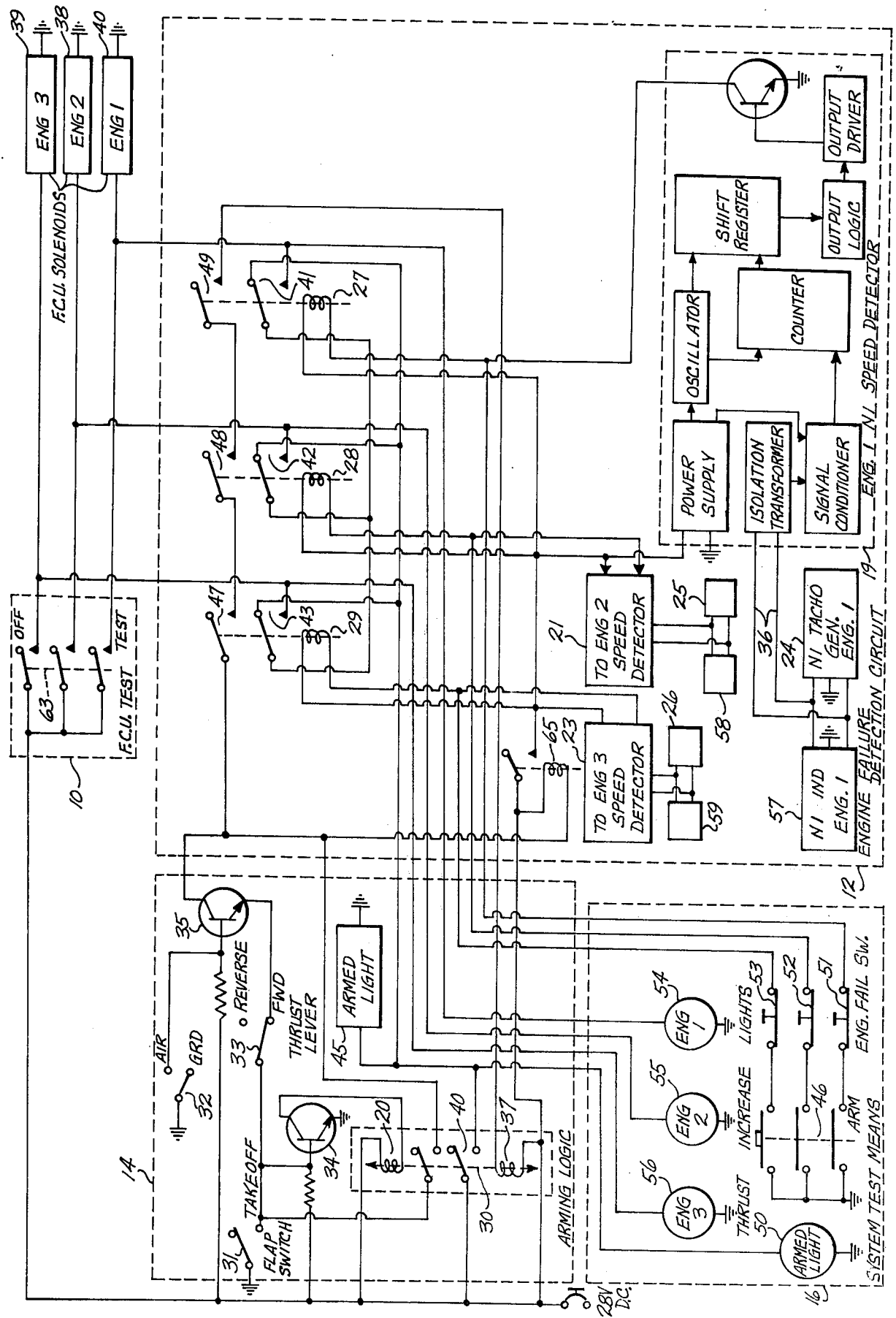

4,034,938

AUTOMATIC PERFORMANCE RESERVE (APR) SYSTEM HAVING MEANS INDICATIVE OF SYSTEM ARMED CONDITION

CROSS-REFERENCE TO RELATED APPLICATION

This application is a continuation-in-part of our United States application, Ser. No. 570,928, now U.S. Pat. No. 3,987,279 filed Apr. 22, 1975 entitled "Automatic Performance Reserve (APR) System" assigned to the same assignee as the present invention.

SUMMARY OF THE INVENTION

The potential gross weight that an aircraft could carry upon departure from a performance limited airfield is reduced in accordance with present regulatory limits relating to field length, take-off second segment (engine out) gradient, and near/remote obstacle clearance.

It is accordingly an object of the present invention to provide an automatic electrical control system in an aircraft, which in the event of an engine failure during take-off, increases the operating engine(s) thrust within the maximum allowable margin of engine limits thereby obtaining a significant payload benefit in aircraft performance.

A previous system which is shown in U.S. Pat. No. 3,514,055 by Gregoire et al, assigned to the assignee of the present invention, provided shutoff of auxiliary units to provide an increase in thrust energy available during take-off in response to an engine failure, the system of the referred to patent being exemplary of one of the various approaches previously utilized to provide increased thrust in the event of an engine failure during take-off. The present system, in contrast, is a logic actuated system responsive to aircraft operation parameters for controlling fuel control solenoids (FCU) associated with the respective engines which when actuated increase fuel flow to provide an incremental increase in thrust (e.g. 1,000 lbs.) on remaining engines in the event of an engine failure during take-off. Also, the aircraft operating parameter preferred to provide a signal representative of engine failure in the aircraft in the present APR system is the $N_1$ compressor speed in contrast to 13th stage pressure utilized in the system of the hereinbefore referenced patent, or such other engine operating parameters such as EPR. $N_1$ compressor speed provides rapid engine failure recognition, is not sensitive to engine surge, and is a signal available directly from the engine which is also provided in conventional pilot displays at the cockpit.

In accordance with a preferred embodiment of the invention, APR system arming logic requires (1) flaps of the aircraft extended (greater than $1^\infty$), (2) aircraft on the round (main gear compressed), (3) $N_1$ speed of the engines greater than a first predetermined speed (e.g. 6400 rpm, representative of take-off condition), and (4) thrust levers in forward position, representative of forward thrust. Decay of $N_1$ speed below a second predetermined speed less than the first predetermined speed (e.g. 5600 rpm, representative of engine failure) results in APR signal energization of the engine FCU (fuel control unit) solenoid scheduling more fuel and increased thrust on the operating engine(s). System response time between engine failure and obtaining 95 percent of the APR thrust increment commanded by the APR signal is less than about 2 seconds.

It is yet another object of the invention to provide an APR system which becomes disarmed in the event of a rejected take-off in response to movement of all aircraft throttles to the idle position.

Another object of the present invention is to provide system test circuit means for testing system operation without aircraft engine system operation.

Other objects, features, and advantages of the disclosed automatic performance reserve system will be apparent from the following detailed description, together with the accompanying drawing illustrative only of a preferred embodiment of the invention.

BRIEF DESCRIPTION OF DRAWING

The drawing diagrammatically illustrates by way of example, not by way of limitation, one form of the invention in which:

the sole FIGURE illustrates by way of block diagram and circuit schematic the logic controlled automatic performance reserve system, having system test circuit means for verifying system integrity.

DETAILED DESCRIPTION OF THE DRAWING

The APR system comprises an engine failure detector circuit 12 for each engine, an arming logic circuit 14, a system test means 16, a test switch 10 to test the fuel control unit (FCU) solenoids 38, 39, and 40.

The system shown in the FIGURE is for a three engined aircraft but the same concepts may be used for aircraft having a different number of engines.

Each engine has a speed detector circuit 19, 21, 23, which detects engine speed from the existing $N_1$ tachometer generators 24, 25, 26, which energizes the speed detector relays 27, 28, and 29, when the engines are at take-off speed.

The arming logic comprises an arming relay 30, a flap switch 31, an air/ground logic switch 32, a thrust lever logic switch 33, and two transistors 34 and 35.

When engine number 1 is operated at take-off speed, the engine speed detector 19 detects the engine speed by signal 36 from the $N_1$ indicating circuit and energizes the speed detector relay 27. Similarly, engines 2 and 3 speed detector relays 28 and 29 are energized by running engines 2 and 3 at take-off speed.

The arming coil 37 of arming relay 30 is energized only when: the air/ground switch 32 is in the ground position, allowing transistor 35 to conduct to prevent arming of the APR system in the air; the flaps are extended to take-off position closing the flap switch 31; engine thrust levers are in the forward position, closing switch 33; and all three speed detectors relays 27, 28, 29 are energized (when all engines are at take-off speed). Arming relay 30 is a latched type and is held in the armed position such that de-energizing of any of the speed detector relays 27, 28, 29 or opening of the air/ground switch 32 when the aircraft leaves the ground does not disarm arming relay 30. Armed light 45 is energized through contacts 40 of arming relay 30.

If during take-off and before the flaps are retracted, engine number 1 fails, this will be detected by engine number 1 speed detector 19 by change of the signal 36 from the $N_1$ indicating system and de-energizing of speed detector relay 27. A signal will then be supplied from the 28 volt power source to engines 2 and 3 FCU solenoids 38 and 39 through relay contacts 40 of arming relay 30, contacts 41 of number 1 engine speed detector relay 27 (now de-energized), and contacts 42 and 43 of engine numbers 2 and 3 speed detector relays 28 and 29 (both energized).

Similarly, if during take-off engine number 2 failed, engines 1 and 3 FCU solenoids 40 and 39 would be energized, and engine number 2 speed detector relay 28 would now be de-energized instead of number 1 speed detector relay 27. Similarly, if engine number 3 failed, engines 1 and 2 FCU solenoids 40 and 38 would be energized, and engine number 3 speed detector relay 29 would now be de-energized instead of number 1 speed detector relay 27.

The system has no on/off control switch and after being armed during take-off will remain armed until the flaps are retracted. When the flaps are retracted (less than 2°), flap switch 31 opens, which allows transistor 34 to provide a ground to energize disarming coil 20 of arming relay 30 thereby disarming arming relay 30 which remains in this position. Power is removed from the engine speed detection circuit by relay 65 now de-energized, and the system cannot now be used until re-armed.

If during take-off and before lift-off it is decided to abort and take-off (RTO), then when all three engines rpm is reduced, for example below 5,600 rpm, the speed detector circuits 19, 21, and 23 will detect the change in speed and de-energize speed detector relays 27, 28, 29. Contacts 41, 42 and 43 of speed detector relays 27, 28, and 29 (previously closed) will all now open. When all three are open, no power can be supplied to any of engine FCU solenoids 38, 39, or 40.

A system test means 16 is provided to test the system operation without the engines running. With the aircraft on the ground, thrust lever set in forward position, and flaps set at take-off position, pressing the arm switch 46 energizes engine speed detector relays 27, 28, and 29. Arming coil 37 of arming relay 30 is then energized through flap switch 31, thrust lever switch 33, transistor 35, and contacts 47, 48, and 49 of engine speed detector relays 29, 28, and 27, so armed lights 45 and 50 illuminate. Pressing engine 1 fail switch 51 de-energizes engine 1 speed detector relay 27. A signal is then supplied from the 28 volt power source to engine 2 and engine 3 FCU's 38 and 39. This signal also illuminates engine 2 thrust increase light 55, and engine 3 thrust increase light 56. Similarly, pressing engine 2 fail switch 52 causes a signal to illuminate thrust increase lights 54 and 56 of engine 1 and engine 3, respectively. Similarly, pressing engine 3 fail switch 53 causes a signal to illuminate thrust increase lights 54 and 55 of engines 1 and 2 respectively. The system will remain armed until the flaps are retracted.

A test switch 63 is provided which, when held on, provides APR signals to all three engine FCU solenoids 38, 39, and 40 to test these solenoids when the engines are running at idle speed. An increase in engine speed will be seen on each engine $N_1$ indicator 57, 58, and 59.

We claim:

1. In an automatic performance reserve system for an aircraft having a plurality of engines:
    first means associated respectively with each of said engines or providing increased fuel flow to the engine;
    speed detector circuit means associated respectively with each of said engines responsive to engine speed;
    relay means responsive to said speed detector circuit means for arming said automatic performance reserve system in response to engine speeds of said plurality of engines representative of take-off power;
    said relay means further responsive to said speed detector circuit means for detecting an engine speed representative of failure of one of said plurality of engines and actuating said first means associated with the remaining ones of said plurality of engines;
    second means for disarming said automatic performance reserve system subsequent to take-off of the aircraft and deactuating said first means associated with the remaining ones of said plurality of engines in the event of failure of one of said plurality of engines; and,
    system test circuit means coupled to said system for testing said system, said system test circuit means including thrust indicator means associated with said plurality of engines, and switching means representative of engine failure for energizing said thrust indicator means.

2. In combination in an aircraft having a plurality of engines, each of said engines having associated therewith fuel flow control means:
    detector circuit means associated with each of said engines for detecting engine failure;
    first means responsive to said detector circuit means in the event of an engine failure for actuating said fuel flow control means associated with the remaining engines;
    second means responsive to thrust lever positioning representative of a rejected take-off condition of said aircraft for disarming said first means in the event of a rejected take-off condition, thereby preventing actuation of said fuel flow control means;
    thrust indicator means responsive to thrust increase of each of said plurality of engines; and,
    switching means for energizing each of said plurality of thrust indicator means.

3. The combination of claim 2 wherein said switching means comprises a switch associated with each of said plurality of engines, each of said switches disposed for energizing a plurality of thrust indicator means.

* * * * *